D. JOHNSON.
NUT LOCK.
APPLICATION FILED MAR. 22, 1910.
970,505.
Patented Sept. 20, 1910.
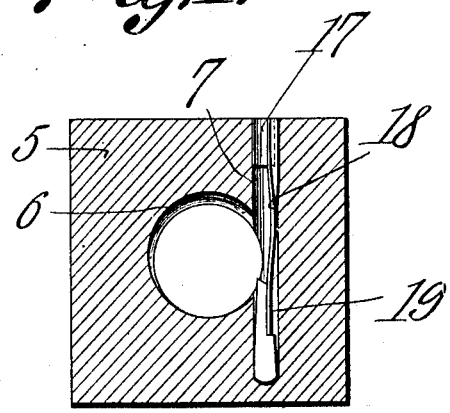
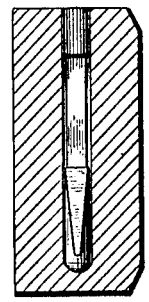
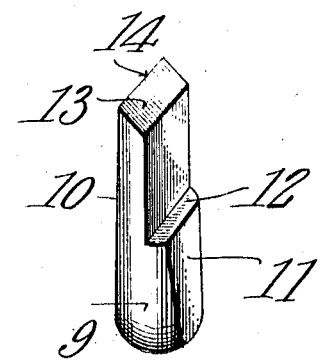
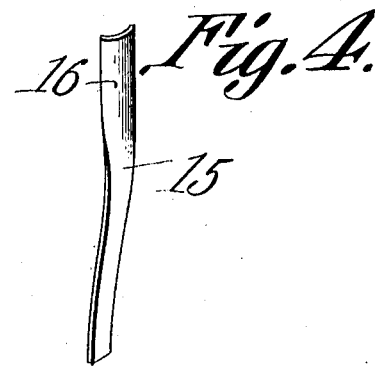
Witnesses
Inventor
Dan Johnson.
By C. A. Snow & Co.
Attorney

UNITED STATES PATENT OFFICE.

DANIEL JOHNSON, OF COLUMBUS GROVE, OHIO.

NUT-LOCK.

970,505.    Specification of Letters Patent.    Patented Sept. 20, 1910.

Application filed March 22, 1910. Serial No. 550,941.

*To all whom it may concern:*

Be it known that I, DANIEL JOHNSON, a citizen of the United States, residing at Columbus Grove, in the county of Putnam and State of Ohio, have invented a new and useful Nut-Lock, of which the following is a specification.

It is the object of the present invention to provide an improved lock nut which will possess the advantage of being applicable to any ordinary bolt and will effectually automatically lock thereon to prevent backward rotation.

One aim of the invention is to construct the nut that none of the locking mechanism whatsoever will be exposed to view so that the nut will present the same appearance as does the ordinary nut now in common use, but will possess all the advantages of a device of this character.

The invention aims further to so construct the nut that it will not be necessary to employ an implement of any character whatsoever in securing a lock between the nut and the bolt, except of course, the use of the ordinary wrench in fitting the nut upon the bolt.

In the accompanying drawings,—Figure 1 is a transverse vertical sectional view through a nut constructed in accordance with the present invention. Fig. 2 is a vertical sectional view taken in a plane at right angles to the plane of Fig. 1. Fig. 3 is a detail perspective view of the pawl of the locking mechanism of the nut. Fig. 4 is a perspective view of the spring for the pawl.

In the drawings, the nut is indicated by the numeral 5 and is formed with the usual bolt opening 6 threaded in the usual manner. The nut is also formed with a bore 7 which opens through one side face of the nut and extends in the direction of the opposite side face thereof and parallel to the plane of the adjacent intermediate side face. It will be observed that at a point between its ends, the bore 7 opens into the bolt opening 6 of the nut, as indicated by the numeral 8.

In the closed end of the bore 7, and more specifically speaking, in that portion of the said bore between its extreme closed end and its intermediate open part 8, there is disposed a pawl, which is indicated by the numeral 9, and is preferably of hardened steel or at least of a quality of steel or iron of a higher degree of hardness than the bolt upon which the nut is to be fitted. One side of this pawl is flattened, as at 10, as is also the opposite side, as indicated by the numeral 11, this latter side being, however, shouldered, as at 12. The two flattened sides 10 and 11 are in planes which converge from the butt end of the pawl, which end is its lower end in Fig. 3 of the drawings. As a result, the pawl is tapered in the direction of its upper end, and as illustrated in Figs. 1 and 3 of the drawings, its said end is beveled, as at 13, so as to afford a sharp biting edge 14.

It will be observed from the drawings that the butt end of the pawl and also the lower closed end of the bore are respectively convex and concave so that the pawl may have slight rocking movement in the bore and the pawl is of such length that when rocked to assume the position illustrated in Fig. 1 of the drawings, which is its normal position, its biting end 14 will project slightly into the bolt opening 8 of the nut so that its said end will be in position for engagement with the threads of the bolt upon which the nut is to be fitted.

In order to hold the pawl in the position illustrated in Fig. 1 of the drawings so that it will have yielding engagement with the threads of the bolt upon which the nut is to be fitted, there is provided a leaf spring which is indicated by the numeral 15 and is flat throughout the major portion of its length although one end is transversely curved, as at 16, for the engagement of a plug 17 which is to be driven into the open end of the bore for the insertion of the spring therein. It will be observed that the intermediate portion of the spring is bent, as at 18, so that its convex side will rest against one side of the bore in the nut, and so its free end, indicated by the numeral 10, will project away from the said side of the bore. This free end, however, seats in the recessed part of the pawl affording the shoulder 12 so that, as will be readily understood, when the threads of the bolt come into engagement with the biting end 14 of the pawl, the pawl will be rocked over toward the side of the bore against which its bent and intermediate portions bear, the result being that the spring is flattened to a greater or less degree. This occurs when the nut is being threaded upon the bolt, and it will be readily understood that should an attempt be made to backwardly rotate the nut upon the bolt, the biting edge 14 of the pawl will dig or bite into the threads of the bolt so as to hold the nut firmly against such backward rotation.

What is claimed is:

1. A lock nut formed with a bore opening between its ends into the bolt opening of the nut, a pawl seated in the closed end of the bore and having a biting edge projecting into the bolt opening, a spring fitted into the bore and secured at one end therein and bearing between its ends against one side of the wall of the bore and at its free end projecting away from the said side of the wall of the bore and bearing against the pawl.

2. A lock nut formed with a bolt opening and with a bore opening between its ends into the bolt opening, a pawl fitted in the bore at the closed end thereof and having a convex butt end whereby to adapt it to rock in the bore, the tip end of the pawl projecting into the bolt opening of the nut, and a spring disposed in the bore and having an end bearing against the pawl.

In testimony that I claim the foregoing as my own, I have hereto affixed my signature in the presence of two witnesses.

DAN. JOHNSON.

Witnesses:
   D. M. ALLEN,
   ALTA EVANS.